United States Patent
Kim

(10) Patent No.: US 9,414,390 B2
(45) Date of Patent: Aug. 9, 2016

(54) METHOD AND APPARATUS FOR MULTI-CELL COOPERATIVE TRANSMISSION

(75) Inventor: Yung-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 688 days.

(21) Appl. No.: 13/330,176

(22) Filed: Dec. 19, 2011

(65) Prior Publication Data

US 2012/0178462 A1 Jul. 12, 2012

(30) Foreign Application Priority Data

Jan. 12, 2011 (KR) .................. 10-2011-0003166

(51) Int. Cl.
- *H04B 1/00* (2006.01)
- *H04W 72/04* (2009.01)
- *H04W 24/10* (2009.01)

(52) U.S. Cl.
CPC .......... *H04W 72/048* (2013.01); *H04W 24/10* (2013.01)

(58) Field of Classification Search
CPC .......................... H04W 72/048; H04W 24/10
USPC ............. 455/422.1, 450–455, 464, 509, 63.1, 455/114.2, 278.1; 370/328–337, 339, 370/341–348, 431–463
See application file for complete search history.

(56) References Cited

U.S. PATENT DOCUMENTS

| | | | |
|---|---|---|---|
| 6,590,878 B1 * | 7/2003 | Uchida et al. ................. | 370/330 |
| 2010/0020702 A1 * | 1/2010 | Wong .................. | H04L 41/5009 370/252 |
| 2010/0142462 A1 * | 6/2010 | Wang et al. .................... | 370/329 |
| 2010/0311349 A1 * | 12/2010 | Koo et al. .................. | 455/67.11 |
| 2011/0098054 A1 * | 4/2011 | Gorokhov .............. | H04B 7/024 455/452.1 |
| 2011/0103339 A1 * | 5/2011 | Kim et al. ...................... | 370/329 |
| 2013/0005376 A1 * | 1/2013 | Shirani-Mehr et al. ........ | 455/509 |

FOREIGN PATENT DOCUMENTS

| | | | |
|---|---|---|---|
| KR | 1020110061465 | 6/2011 | |
| KR | 1020110127054 | 11/2011 | |
| WO | WO 2009134093 A2 * | 11/2009 | ............ H04W 16/02 |
| WO | WO 2010/081426 | 7/2010 | |

\* cited by examiner

*Primary Examiner* — Ronald Eisner
(74) *Attorney, Agent, or Firm* — The Farrell Law Firm, P.C.

(57) ABSTRACT

A method and apparatus for multi-cell cooperative transmission are provided, for increasing the capacity of an MS at a cell edge through cooperation among a plurality of adjacent cells or BSs each having a plurality of antennas. The present invention improves Coordinated Multi Point (CoMP) performance due to simple CoMP implementation and reduced backhaul overhead and delay, and enables simple implementation of a CoMP resource allocation process and reduces handover overhead by eliminating handover between CoMP processing units.

34 Claims, 10 Drawing Sheets

METHOD AND APPARATUS FOR MULTI-CELL COOPERATIVE TRANSMISSION

PRIORITY

This application claims priority under 35 U.S.C. §119(a) to a Korean Patent Application filed in the Korean Intellectual Property Office on Jan. 12, 2011 and assigned Serial No. 10-2011-0003166, the contents of which are incorporated herein by reference.

BACKGROUND OF THE INVENTION

1. Field of the Invention

The present invention relates generally to a wireless communication system, and more particularly, to a method and apparatus for multi-cell cooperative transmission in a wireless communication system.

2. Description of the Related Art

When adjacent cells use the same frequency in a cellular communication environment, severe interference occurs at a cell edge. Techniques that have been proposed to reduce inter-cell interference and increase the capacity of a cell edge. Among them, 3rd Generation Partnership Project (3GPP) Long-Term Evolution (LTE) and Institute of Electrical and Electronics Engineers (IEEE) IEEE 802.16e/16m support Inter-Cell Interference Coordination (ICIC). ICIC is a technology for reducing inter-cell interference by controlling transmission power per frequency resource over a long term, considering the traffic and interference of Mobile Stations (MSs) within each cell. Although ICIC can reduce interference with MSs at a cell edge by preventing neighbor cells from transmitting signals in specific frequency resources or controlling the neighbor cells to transmit signals in the frequency resources with reduced transmission power, ICIC has limitations in increasing capacity due to reduction of inter-cell interference only through resource allocation and transmission power control.

Compared to ICIC, Coordinated Multi-Point (CoMP) transmission/reception or multi-cell Multiple Input Multiple Output (MIMO) coordinates neighbor cells with one another according to the instantaneous channel and traffic state of a cell-edge MS.

One of the CoMP schemes, Coordinated Scheduling/Coordinated Beamforming (CS/CB) CoMP increases the capacity of a cell-edge MS by selecting, when a plurality of Base Stations (BSs) communicate with MSs through beamforming, antenna beamforming for each of the BSs in such a manner that a signal from a serving BS is strongest and interference signals from neighbor BSs are weakest. CS/CB CoMP cooperative BSs transmit data only to their MSs, not to the MSs of neighbor cooperative cells. Another CoMP scheme, Joint Processing (JP) CoMP increases the capacity of a cell-edge MS by enabling a plurality of neighbor BSs to transmit the same information to the cell-edge MS almost simultaneously. Additionally, a plurality of BSs may simultaneously transmit user signals to a plurality of MSs in order to increase overall cell capacity. Therefore, JP CoMP cooperative BSs transmit data to MSs of neighbor cooperative cells as well as to their MSs.

Despite the advantage of an increased cell-edge and average cell capacity compared to ICIC, CoMP has deficiencies in that a large amount of information should be received through a backhaul, for BS cooperation, and scheduling for resource allocation and CoMP signal processing computation is complex.

SUMMARY OF THE INVENTION

An aspect of the present invention is to address at least the problems and/or disadvantages and to provide at least the advantages described below. Accordingly, an aspect of the present invention is to provide a method and apparatus for increasing the capacity of an MS at a cell edge through cooperation among a plurality of adjacent cells or BSs each having a plurality of antennas.

Another aspect of the present invention is to provide a CoMP method and apparatus that has low complexity and can be simply realized.

Another aspect of the present invention is to provide a BS cooperation method and apparatus which simplify resource allocation to an MS and computation of a transmission antenna value for the MS, for cell/BS cooperation and which can be readily realized in an actual environment.

Another aspect of the present invention is to provide a BS cooperation method and apparatus for allocating radio resources for BS cooperation to a CoMP MS by a serving BS of the CoMP MS and operating neighbor BSs based on the radio resource allocation of the serving BS.

Another aspect of the present invention is to provide a method and apparatus for enabling BSs to cooperate with one another on a supercell basis, for signal transmission to an MS at an edge of a supercell including a plurality of cells.

In accordance with an embodiment of the present invention, there is provided a multi-cell cooperative transmission method, in which it is determined whether an MS located in a serving coverage for a CoMP operation is a cell-edge MS or a cell-inner MS in the serving coverage, if the MS is determined to be a cell-edge MS, at least one secondary coverage is determined for the cell-edge MS from among neighbor coverages, for BS cooperative transmission to the cell-edge MS, a serving manager that manages a CoMP operation within the serving coverage allocates radio resource to the cell-edge MS based on channel information reported by the cell-edge MS, resource allocation information indicating the allocated radio resource and the channel information are transmitted to at least one secondary manager that manages a CoMP operation in the at least one secondary coverage, and signals are transmitted to the cell-edge MS simultaneously using the allocated radio resource through cooperation by BSs of the serving coverage and the at least one secondary coverage.

In accordance with an embodiment of the present invention, there is provided a multi-cell cooperative transmission method in which channel information reported to a neighbor manager that manages a CoMP operation in a neighbor coverage for the CoMP operation, by a cell-edge MS located in the neighbor coverage, and resource allocation information indicating radio resource allocated to the cell-edge MS by the neighbor manager are received from the neighbor manager, and signals are transmitted to the cell-edge MS simultaneously using the allocated radio resource through cooperation by BSs of a serving coverage and the neighbor coverage.

In accordance with an embodiment of the present invention, there is provided a BS for performing multi-cell cooperative transmission, in which an MS decider determines whether an MS located in a serving coverage for a CoMP operation is a cell-edge MS or a cell-inner MS in the serving coverage, the decider determines, when the MS is determined to be a cell-edge MS, at least one secondary coverage for the cell-edge MS from among neighbor coverages, for BS cooperative transmission to the cell-edge MS, a resource allocator allocates radio resource to the cell-edge MS based on channel information reported by the cell-edge MS, and a transmitter transmits resource allocation information indicating the allocated radio resource and the channel information to at least one secondary manager that manages a CoMP operation in the at least one secondary coverage, and transmits a signal to the cell-edge MS using the allocated radio resource through cooperation simultaneously with each BS of the at least one secondary coverage.

In accordance with an embodiment of the present invention, there is provided a BS for performing multi-cell cooperative transmission, in which a receiver receives, from a neighbor manager that manages a CoMP operation in a neighbor coverage predetermined for the CoMP operation, channel information reported to the neighbor manager by a cell-edge MS located in the neighbor coverage and resource allocation information indicating radio resource allocated to the cell-edge MS by the neighbor manager, and a transmitter transmits a signal to the cell-edge MS using the allocated radio resource through cooperation simultaneously with each BS of the neighbor coverage.

BRIEF DESCRIPTION OF THE DRAWINGS

The above and other objects, features and advantages of embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
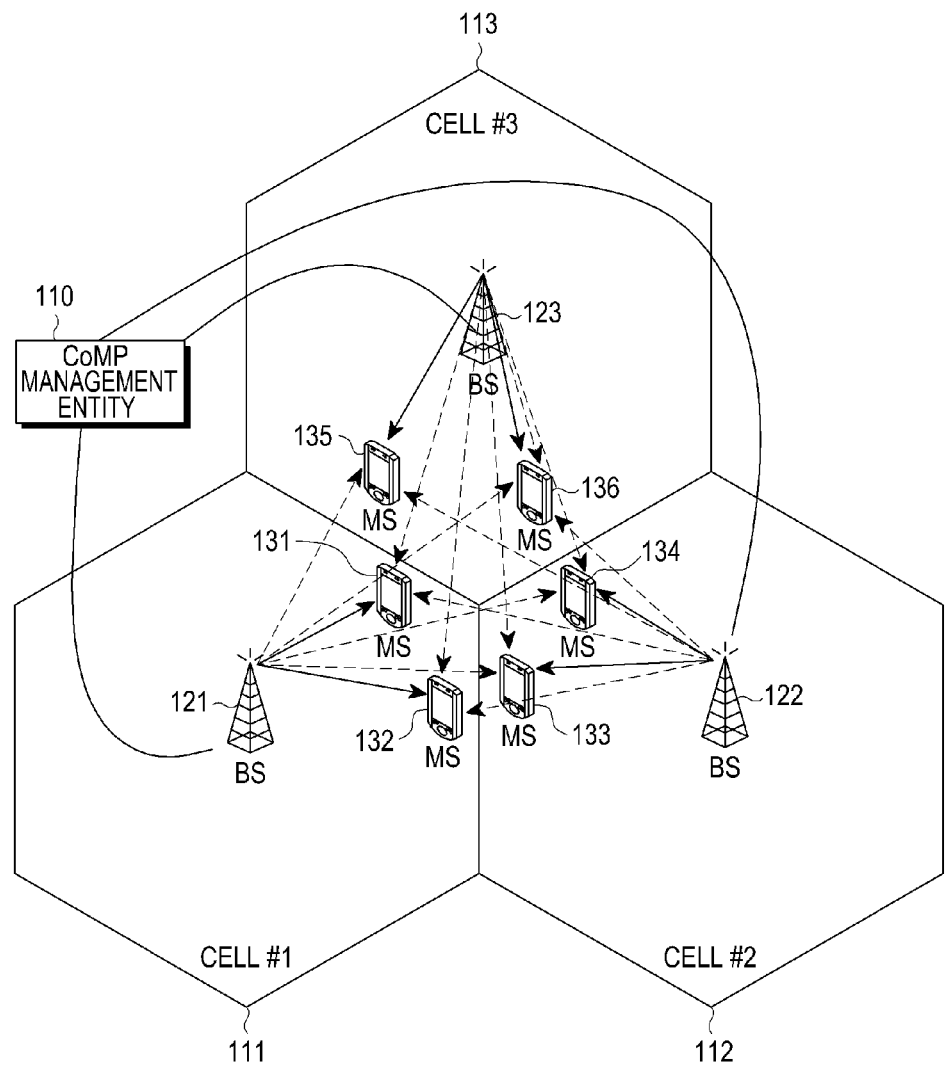
FIG. 1 illustrates a network in which BSs transmit signals to MSs through cooperation among the BSs.

Reference will be made to embodiments of the present invention with reference to the attached drawings. Like reference numerals denote components having substantially the same function through the specification and the drawings. A detailed description of known functions and operations will not be given for the sake of clarity and conciseness.

The following description is given of a multi-cell cooperative transmission operation in a wireless cellular communication system conforming to the Institute of Electrical and Electronics Engineers (IEEE) 802.16e/m standard. However, it will be clearly understood to those skilled in the art that the multi-cell cooperative transmission operation according to the present invention is not limited to the specific communication protocol or system configuration and thus many variations and modifications can be made within the scope and spirit of the present invention.

CoMP may be implemented for transmission of user data from a BS to a specific MS among signals transmitted from the BS to MSs, according to the channel state of the specific MS. A common control signal carrying cell-specific information is preferably transmitted independently from each cell, not through cooperation among a plurality of cells. Herein, a primary cell or BS refers to a serving cell or BS of an MS, which transmits both user data and a common control signal to the MS. A secondary cell or BS refers to a neighbor cell or BS or an interfering cell or BS, which transmits user data to the MS or minimizes interference with the MS, for CoMP cooperation.

FIG. 1 illustrates a network in which BSs transmit signals to MSs through cooperation.

Referring to FIG. 1, three BSs 121, 122, and 123 cover cells 111, 112 and 113 (Cell #1, Cell #2 and Cell #3), which may overlap each other, and transmit signals to MSs 131 to 136 within their cells or neighbor cells. The MSs 131 to 136 simultaneously receive signals from their serving BSs, as indicated by solid lines and signals from their cooperative BSs, as indicated by dotted lines. For example, the MSs 131 and 132 are located at the edge of Cell #1 managed by the BS 121 and receive user data signals and a common control signal from the BS 121, simultaneously with reception of CoMP-based user data signals from the BSs 122 and 123 of neighbor cells, Cell #2 and Cell #3. The BS 121 is a serving or primary BS for the MSs 131 and 132 and the BSs 122 and 123 are neighbor or secondary BSs for the MSs 131 and 132. Likewise, the MSs 133 to 136 may receive signals from the three BSs 121, 122 and 123 through BS cooperation.

An MS that receives signals from a plurality of BSs through BS cooperation will be referred to as a CoMP MS and BSs that transmit signals to a CoMP MS almost simultaneously will be referred to as cooperative BSs. The cooperative BSs may allocate resources and calculate transmit antenna weights based on channel information between the CoMP MS and all of the cooperative BSs, acting as a single BS for BS cooperation. Because the cooperative BSs are geographically apart from one another, they should exchange information needed for cooperation, such as channel information, through a backhaul. In addition, each cooperative BS should perform CoMP MS selection, resource allocation, and calculation of a transmit antenna weight at one time and notify other cooperative BSs of the results.

It is very difficult for all the cooperative BSs to perform these operations simultaneously and share the operation results with one another. Therefore, a CoMP management entity 110 is used to provide a coordinated process for a plurality of cooperative BSs. The CoMP management entity 110 has process functions for BS cooperation, specifically MS selection, scheduling for resource allocation, and calculation of transmit antenna weights. A CoMP BS cluster is a group of cooperative BSs connected to the CoMP management entity 110. In FIG. 1, the CoMP BS cluster includes the BSs 121, 122 and 123. The CoMP management entity 110 may be configured separately or may reside in any one BS depending on system implementation.

Figure 2:
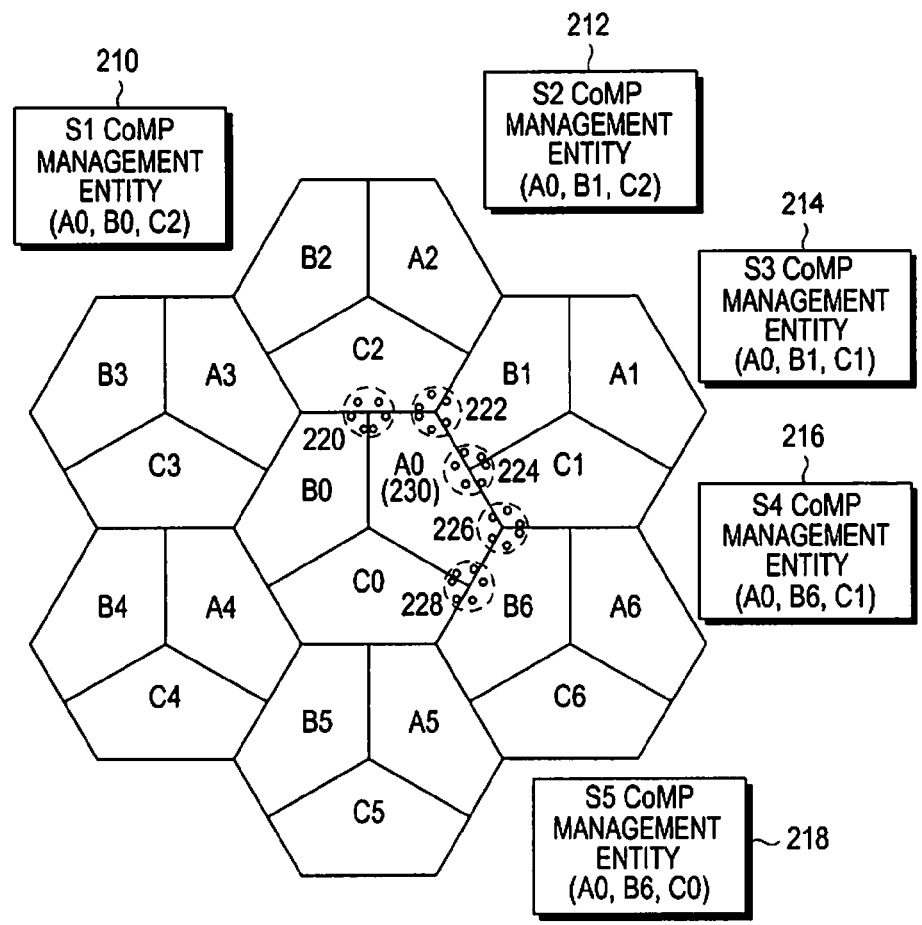
FIG. 2 illustrates the complexity of the Coordinated Multi-Point (CoMP) technology in an actual cellular environment.

FIG. 2 illustrates the complexity of the CoMP technology in an actual cellular environment. As illustrated in FIG. 2, a large number of cells are adjacent to one another and many cells cooperate in various combinations in an actual cellular environment, all of which complicates the BS cooperation.

Referring to FIG. 2, six cells, Cell B0, Cell C0, Cell B1, Cell C1, Cell C2, and Cell B6 are adjacent to a cell 230 (Cell A0). If Cell A0 operates in cooperation with the neighbor cells, a plurality of CoMP cooperative cell combinations may be produced according to the positions of MSs. In FIG. 2, five combinations 220, 222, 224, 226 and 228 (S1 to S5) are created for cooperation between Cell A0 and its neighbor cells. Combination S1 covers MSs serviced by Cell A0, Cell B0 and Cell C2, combination S2 covers MSs serviced by Cell A0, Cell B1 and Cell C2, combination S3 covers MSs serviced by Cell A0, Cell B1 and Cell C1, combination S4 covers MSs serviced by Cell A0, Cell B6 and Cell C1, and combination S5 covers MSs serviced by Cell A0, Cell B6 and Cell C0 through cooperation.

CoMP management entities 210, 212, 214, 216 and 218 each connected to a plurality of BSs (i.e. a BS cluster) manage the respective combinations S1 to S5. Each CoMP management entity receives information from its BS cluster, performs scheduling and calculates transmit antenna weights based on the received information, and transmits the scheduling result and the calculated transmit antenna weights to the cooperative BSs of the BS cluster. For example, the CoMP management entity 210 managing Combination S1 (hereinafter S1 CoMP management entity 210) operates in connection to the cooperative BSs of Cell A0, Cell B0 and Cell C2 that service MSs covered by Combination S1 through cooperation, receives channel information about the MSs of Combination S1 from the cooperative BSs, performs scheduling, calculates transmit antenna weights, and transmits the scheduling result and the calculated transmit antenna weights to the cooperative BSs. The cooperative BSs transmit signals to the MSs of Combination S1 almost simultaneously according to resource allocation information representing the resource allocation result and the transmit antenna weights.

The CoMP management entities 210, 212, 214, 216 and 218 should exchange a substantial amount of information with BSs for their operations, thereby increasing backhaul overhead. Moreover, transmission of calculation results from the CoMP management entities 210, 212, 214, 216 and 218 increases backhaul delay, which may be a cause of CoMP performance degradation in an environment of transitory MSs.

The optimal CoMP BS cluster may be different for an MS according to the position of the MS in a cell and each cell may be involved in a plurality of CoMP BS clusters. Therefore, the result of scheduling performed by one CoMP management entity associated with a cell affects scheduling of another CoMP management entity associated with the cell. Thus, the CoMP management entities should exchange scheduling information with each other.

Moreover, when an MS is moving, the CoMP BS cluster of the MS changes according to the position of the MS and thus a handover operation between CoMP management entities may be required. Because the geographical area of MSs covered by each CoMP management entity is different from a cell area, handover between CoMP management entities is added to a conventional inter-cell handover. As a consequence, overall system complexity increases.

An embodiment of the present invention described below provides an improved CoMP technique that enables a plurality of BSs to transmit signals to an MS through cooperation, with decreased implementation complexity. A serving BS allocates radio resources to its CoMP MS, and a neighbor cooperative BS, i.e. a secondary BS transmits a signal to the CoMP MS in cooperation with the serving BS according to the resource allocation of the serving BS. Specifically, the serving BS allocates resources to its CoMP MS at a cell edge and transmits the resource allocation result to the secondary BS. The resource allocation of the serving BS is simple because it is not affected by resource allocation of the secondary BS.

Figure 3:
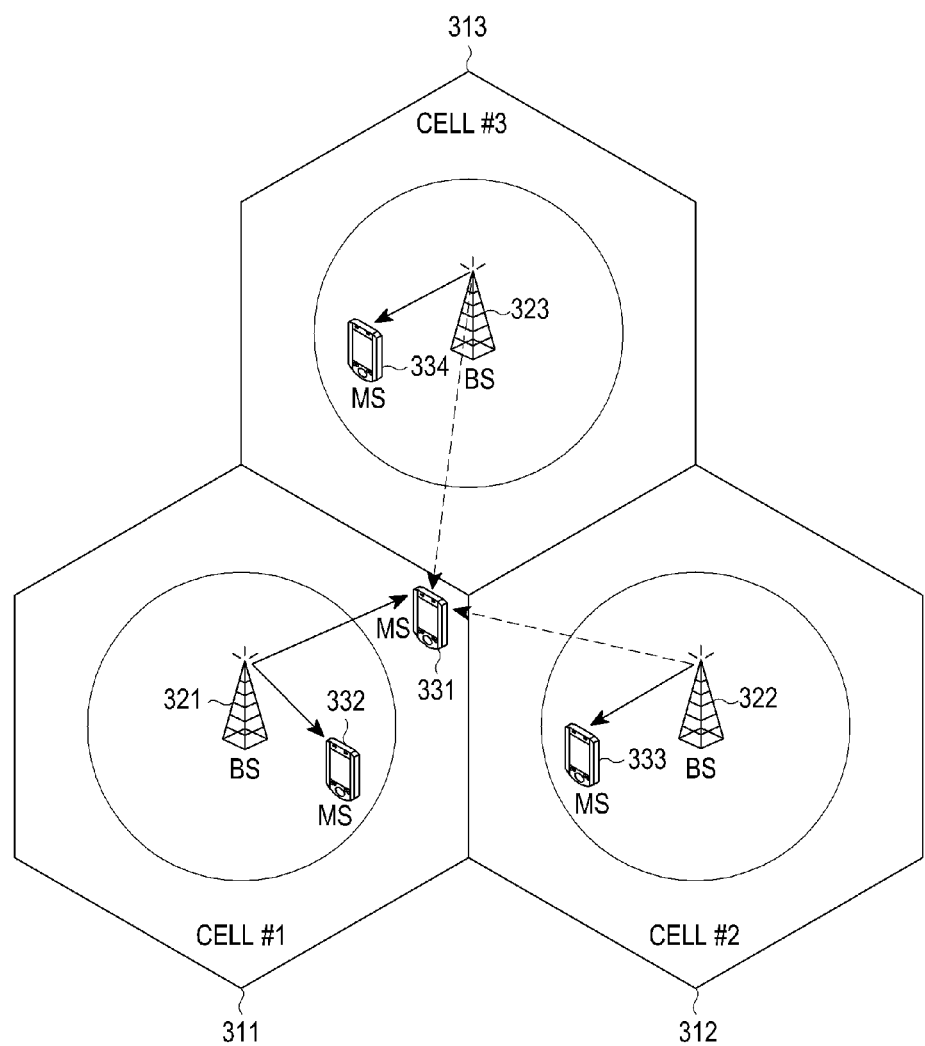
FIG. 3 illustrates the configuration of a network in which BSs transmit a signal to an MS through cooperation among the BSs according to an embodiment of the present invention.

FIG. 3 illustrates a network in which BSs transmit signals to an MS through cooperation according to an embodiment of the present invention.

Referring to FIG. 3, three BSs 321, 322 and 323 manage their unique cells 311, 312 and 313 (Cell #1, Cell #2 and Cell #3) that may partially overlap each other and transmit signals to MSs 331 to 334 located within their cells or neighbor cells. The MSs 331 and 332 within Cell #1 are classified into a cell-edge MS and a cell-inner MS, respectively, according to their positions in Cell #1. The BS 321 of Cell #1 transmits a signal in the same time/frequency resources to the cell-edge MS 331 and the cell-inner MS 332 and acts as a serving BS, i.e. a primary BS for the MSs 331 and 332. The BS 321 allocates radio resources to the cell-edge MS 331 and transmits the radio resource allocation result to the BSs 322 and BS #323.

The MSs 333 and 334 are located respectively within the neighbor cells, Cell #2 and Cell #3. The MSs 333 and 334 are cell-inner MSs for the BSs 322 and 323, respectively. The BS 322 of Cell #2 transmits a signal in the same time/frequency resources to the MS 331 and its cell-inner MS 333 and the BS 323 of Cell #3 also transmits a signal in the same time/frequency resources to the MS 321 and its cell-inner MS 334. The BSs 322 and 323 transmit the signals to the MS 331 based on the resource allocation result received from the BS 321. Therefore, the BS cooperative transmission is simplified without the need for coordinated scheduling including information exchange between the BSs 321, 322 and 323 and CoMP management entities.

The cell-edge MS 331 of Cell #1 is a CoMP MS. Although the BSs 321, 322 and 322 cooperate with one another in transmitting signals to the CoMP MS 331, they do not cooperate for their cell-inner MSs 332, 333 and 334. If the BSs 321, 322 and 323 have a sufficient number of transmission antennas, a plurality of CoMP MSs may exist at the edge of Cell #1 and a plurality of cell-inner MSs may also exist therein. While the BS 321 shares channel information about the cell-edge MS 331 with the BSs 322 and 323 by transmitting channel information of the cell-edge MS 331 to the BSs 322 and BS 323, channel information of the cell-inner MSs 332, 333 and 334 are not shared among the BSs 321, 322 and 323.

Transmit antenna weights for use in transmitting signals to the cell-edge MS 331 and the cell-inner MS 332, 333 or 334 may be calculated using, for example, a single-cell multi-user MIMO scheme. According to the single-cell multi-user MIMO scheme, a cell-inner MS is selected, which has a channel orthogonal or almost orthogonal to the channel of the cell-edge MS 331 and thus exerts a negligible interference on the cell-edge MS 331 and transmit antenna weights are calculated for the channels of the selected cell-inner MS and the cell-edge MS 331 using Zero Forcing (ZF) or Minimum Mean Squared Error (MMSE). Computation complexity is reduced as transmit antenna weights are calculated separately for each of the cooperative BSs of a CoMP BS cluster rather than at one time for all the cooperative BSs. In addition, backhaul delay and backhaul overhead are reduced because one entity (e.g. a CoMP management entity) is not calculating transmit antenna weights and transmitting them to other BSs.

Joint Processing (JP) CoMP or Coordinated Scheduling/ Coordinated Beamforming (CS/CB) CoMP can be implemented. In JP CoMP, the BSs 321, 322 and 323 transmit data signals simultaneously to the cell-inner MSs 332, 333 and 334 and the CoMP MS 331, whereas in CS/CB CoMP, the BS 321 transmits data simultaneously to the cell-inner MS 332 and the CoMP MS 331, while the BSs 322 and 323 transmit signals only to their own cell-inner MSs 333 and 334, without transmitting any signal to the CoMP MS 331. Thus, interference with the CoMP MS 331 is reduced.

If a cooperative BS cannot transmit data to its cell-inner MS in radio resources allocated to a CoMP MS without sufficiently reducing interference with the CoMP MS, the cooperative BS may not transmit data in the radio resources allocated to the CoMP MS by terminating the radio resources. This operation may be performed, for example, when the cooperative BS significantly interferes with the CoMP MS due to a lack of transmission antennas, all MSs are located at a cell edge or in the vicinity of the cell edge, there are only MSs much interfering the CoMP MS in view of channel characteristics, or transmit antenna weights cannot be accurately calculated because of inaccurate channel values.

While a CoMP MS is shown in FIG. 3 as located within Cell #1, the CoMP MS may exist in other cells of the same CoMP BS cluster, that is, in Cell #2 or Cell #3. Cell #2 is the primary or serving cell of the CoMP BS cluster for the CoMP MS when the CoMP MS is located within Cell #2, and Cell #3 is the primary or serving cell of the CoMP BS cluster for the CoMP MS when the CoMP MS is located within Cell #3. That is, a CoMP MS exists only in one cell of one CoMP cluster.

Neighbor BSs use different time and frequency resources for their CoMP MSs. For example, BSs or cells may be classified into a plurality of types and different subbands or time intervals may be allocated according to the BS or cell types, to facilitate resource allocation in the cellular environment. Specifically, an entire frequency band is divided into as many subbands (time intervals or time-frequency resource regions) as cell types and each subband is designated as a primary subband for a cell type.

Figure 4:
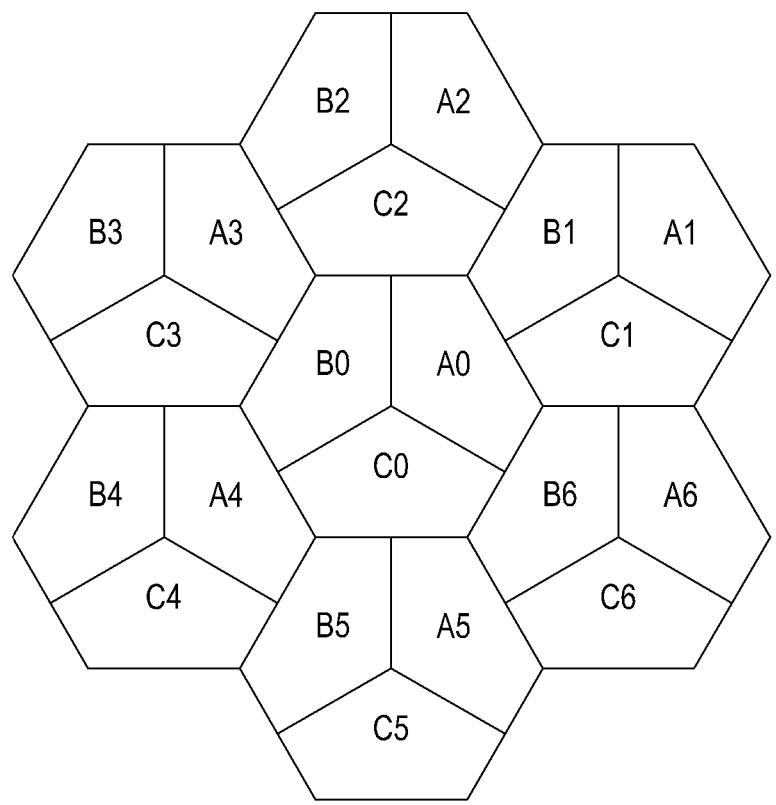
FIG. 4 illustrates an example of cell types according to an embodiment of the present invention.

FIG. 4 illustrates an example of cell types according to an embodiment of the present invention. As illustrated in FIG. 4, each cell is classified as type A, type B and type C and cells of different types service their CoMP MSs in different subbands or different time intervals. In an embodiment of the present invention, cell types are defined such that a cell does not have the same cell type as any of its six neighbor cells. Every cell has a primary subband that does not overlap those of its neighbor cells. However, the primary subbands of the neighbor cells may overlap. For instance, Cell B0, Cell B1 and Cell B6 neighboring to Cell A0 use Subband 2, illustrated in FIGS. 5 and 6, as their primary subband. Accordingly, the BS of Cell A0 should consider resource allocation to and interference with cell-edge MSs of Cell B0, Cell B1 and Cell B6, when selecting a cell-inner MS to be serviced in Subband 2.

Figure 5:
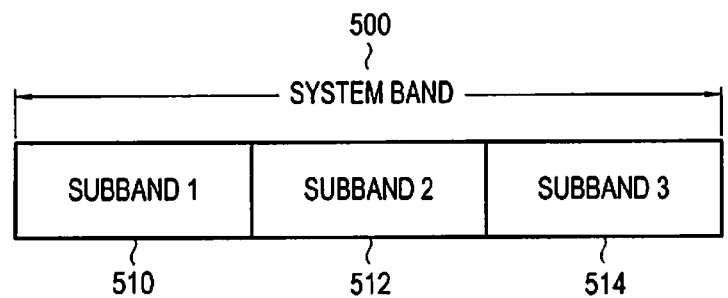
FIG. 5 illustrates an example of frequency band partitioning for cell types according to an embodiment of the present invention.

FIG. 5 illustrates an example of frequency band partitioning for cell types according to an embodiment of the present invention.

Referring to FIG. 5, an entire system band 500 is divided into three subbands 510, 512 and 514, which are assigned as primary subbands for use in servicing CoMP MSs of cells having predetermined cell types. Specifically, subband 510 (Subband 1) is assigned as a primary subband and the other subbands 512 and 514 (Subband 2 and Subband 3) are assigned as secondary subbands, for type-A cells. For type-B cells, Subband 2 is assigned as a primary subband and Subband 1 and Subband 3 are assigned as secondary subbands. For type-C cells, Subband 3 is assigned as a primary subband and Subband 1 and Subband 2 are assigned as secondary subbands.

The BS of each cell allocates resources to its CoMP MS in its primary subband and cooperates in its secondary subbands with neighbor cells according to resource allocation results of the neighbor cells.

Figure 6:
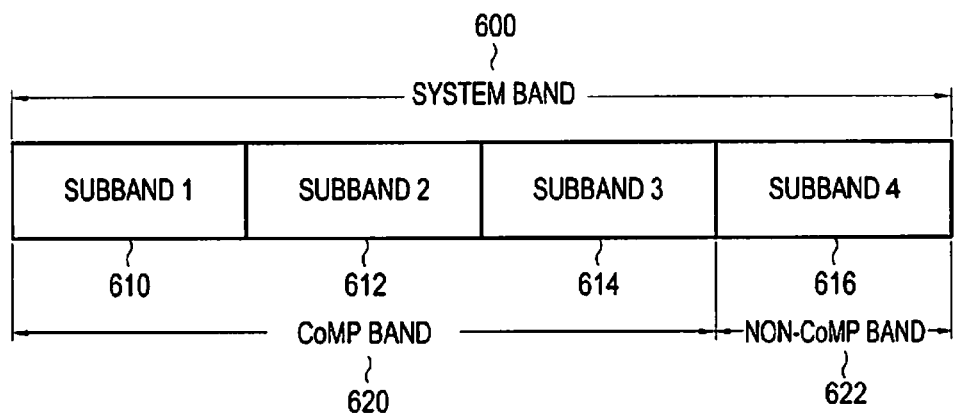
FIG. 6 illustrates another example of frequency band partitioning for cell types according to an embodiment of the present invention.

FIG. 6 illustrates another example of frequency band partitioning for cell types according to an embodiment of the present invention.

Referring to FIG. 6, an entire system band 600 is divided into a CoMP band 620 and a non-CoMP band 622. The CoMP band 620 is further divided into three subbands 610, 612 and 614 and the non-CoMP band 616 includes a single subband. The subbands 610, 612 and 614 of the CoMP band 620 are allocated as primary subbands for different cell types, in a similar manner to FIG. 5. The non-CoMP band 616 is used for all cells to transmit signals to MSs in a single-cell signal transmission scheme without using CoMP. While the non-CoMP band 616 is shown in FIG. 6 as having one subband, one or more subbands may be included in the non-CoMP band 616 depending on system implementation.

Figure 7:
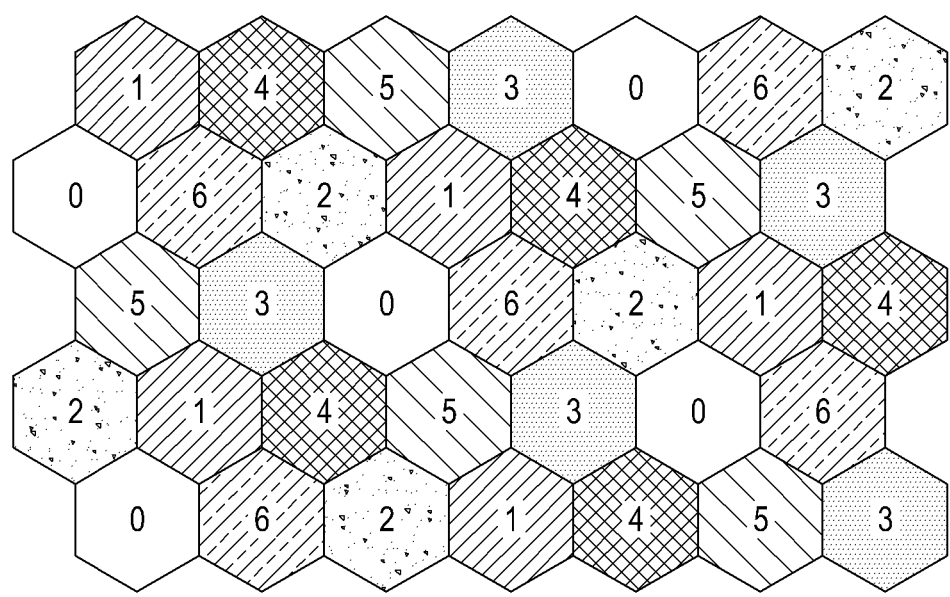
FIG. 7 illustrates another example of cell types according to an embodiment of the present invention.

FIG. 7 illustrates another example of cell types according to an embodiment of the present invention. As illustrated in FIG. 7, each cell is classified as one of 7 types. An entire system band includes at least 7 subbands to support CoMP and each subband is allocated as a primary subband for a predetermined cell type. Besides the 7 subbands for the 7 cell types, the entire system band may further include a non-CoMP band. In FIG. 7, each cell has a different cell type from its six neighbor cells and thus the primary band of each cell does not overlap with those of its neighbor cells. Therefore, the BS of each cell may consider only its CoMP MS in selecting a cell-inner MS in its primary subband.

While frequency-domain resource allocation for supporting a CoMP MS has been described above with reference to FIGS. 5 and 6, the same resource allocation is applicable to the time domain or two-dimensional time-frequency areas. That is, a time area (a frame or a superframe) may be divided into a plurality of subframes or time slots and different primary subframes/time slots may be allocated for different cell types.

An example of resource allocation in the time-frequency domain will be described below with reference to FIG. 4. The entire cells are classified into type A, type B and type C and then further into type 0, type 1 and type 2. For example, a cell A0 has the type A and the type 0, a cell B1 has the type B and the type 1, and a cell C2 has the type C and the type 2. Primary subbands occupying different frequency bands are allocated to cell types A, B and C and primary subframes occupying different time resources are allocated to cell types 0, 1 and 2. Thus, the primary subband-subframe resource combination of each cell does not overlap with those of its neighbor cells. Accordingly, the BS of each cell can consider only resource allocation to and interference with its CoMP MS in selecting a cell-inner MS in each subband/subframe.

Figure 8:
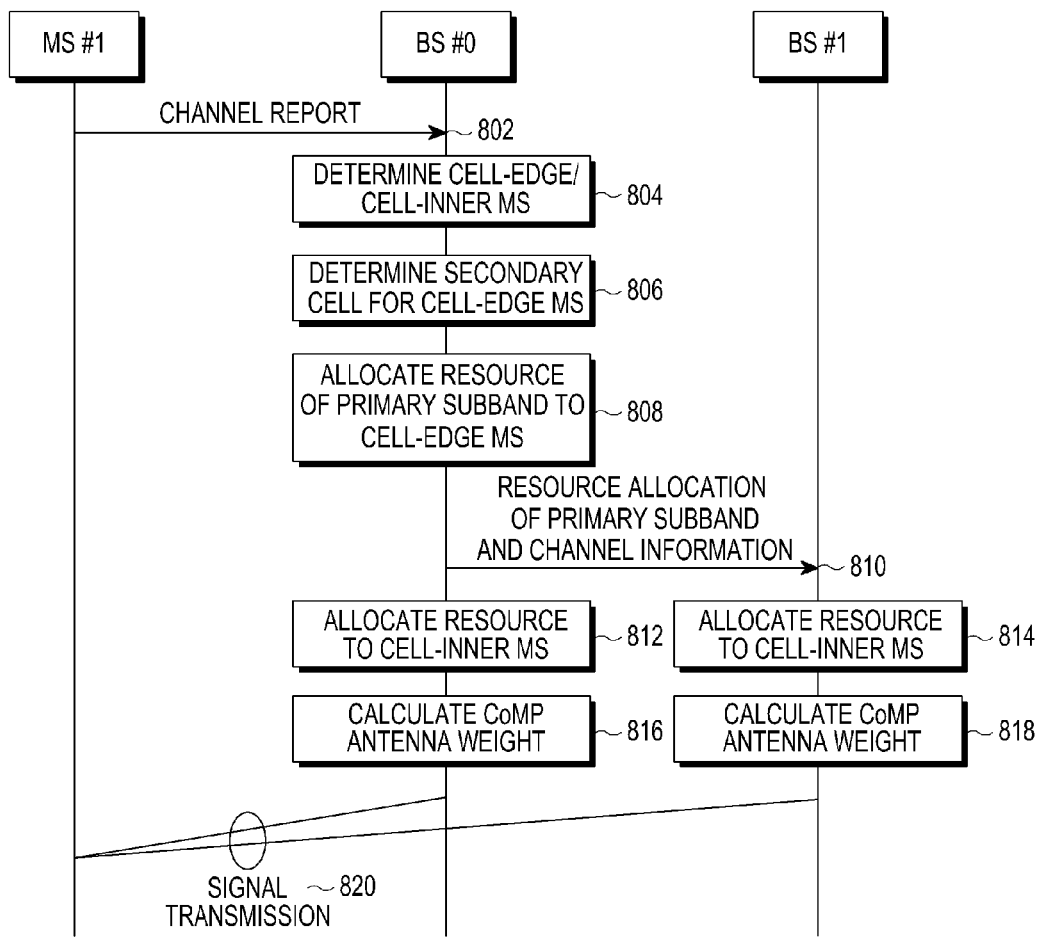
FIG. 8 illustrates a BS cooperation procedure according to an embodiment of the present invention.

FIG. 8 illustrates a BS cooperation procedure according to an embodiment of the present invention. BS #0 is the serving or primary BS of MS #1 and BS #1 is a neighbor or secondary BS of MS #1. MS #1 is both a cell-edge MS and a CoMP MS for BS #0. While only one MS, one serving BS, and one neighbor BS are shown in FIG. 8, each BS can perform the BS cooperation procedure of FIG. 8 for all MSs within its cell and a plurality of neighbor BSs.

Referring to FIG. 8, MS #1 reports channel information about the serving cell and the neighbor interfering cells and other information to its serving BS, BS #0 in step 802. The channel information and other information include at least one of Reference Signal Received Powers (RSRPs), Received Signal Strength Indicators (RSSIs), Channel Quality Information (CQI), Precoding Matrix Indicators (PMIs), Rank Indicators (RIs), channel transfer function information, and information about the position of the MS.

In step 804, the serving BS determines whether the MS is a cell-edge MS or a cell-inner MS based on the reported information. For example, when the serving BS uses the position information reported by the MS, the serving BS determines that the MS is a cell-inner MS if the distance between the serving BS and the MS is below a threshold with respect to a cell radius. If the distance between the serving BS and the MS is greater than or equal to the threshold, the serving BS determines that the MS is a cell-edge MS.

In another example, when the reported channel information is used, the serving BS calculates the ratio of the signal strength of the serving BS to the interference and noise of the neighbor cells, that is, a Signal to Interference and Noise Ratio (SINR) of the MS. If the SINR is equal to or greater than a threshold, the serving BS determines that the MS is a cell-inner MS. If the SINR is less than the threshold, the serving BS determines that the MS is a cell-edge MS. If the MS is a cell-inner MS, the serving BS services the MS in a secondary subband/subframe according to a conventional scheduling scheme. Hereinbelow will describe an operation in which, if the MS is determined to be a cell-edge MS, a plurality of BSs cooperate with each other to transmit signals to the cell-edge MS.

In step 806, the serving BS determines one or more neighbor secondary cells or BSs to cooperate with in transmitting a signal to the cell-edge MS. For example, neighbor cells having RSRPs or RSSIs exceeding a threshold are selected as secondary cells for the MS. In another embodiment of the present invention, secondary cells may be selected by comparing the ratios of the received signal strengths of the serving cell to the received signal strengths of the neighbor cells with a threshold. In another embodiment of the present invention, the cells of neighbor BSs within a distance from the MS may be selected as secondary cells according to the position information about the MS.

The serving BS #0 allocates radio resource to the cell-edge MS in its primary subband/subframe and determines an appropriate Modulation and Coding Scheme (MCS) for the cell-edge MS in step 808 and transmits radio resource allocation information and channel information about the cell-edge to at least one secondary BS #1 determined for the cell-edge MS in the primary subband/subframe in step 810. The channel information includes channel information about the serving cell and the neighbor cells reported by the cell-edge MS.

While each BS operates as a primary BS for a CoMP MS in its primary subband/subframe, it operates as a secondary BS for a CoMP MS in its secondary subband/subframe. Accordingly, in steps 812 and 814, each of the serving and secondary BSs selects at least one of its cell-inner MSs to which it will transmit a signal in the same radio resources allocated to CoMP MSs of neighbor cells in its secondary subband/subframe, considering interference with the CoMP MSs of the neighbor cells, and allocates an MCS and radio resource to the cell-inner MS. In addition, each of the serving and secondary BSs selects at least one cell-inner MS to which it will transmit a signal in the same radio resources allocated to its CoMP MSs, considering the number of MSs to which it can simultaneously transmit a signal in its primary subband/subframe and allocates an MCS and radio resource to the cell-inner MS.

In step 816, the serving BS #0 calculates a transmit antenna weight for transmitting a signal to the cell-edge MS in the primary subband/subframe, referring to the channel information of the cell-edge MS. Similarly, the secondary BS #1 calculates a transmit antenna weight for transmitting a signal to the cell-edge MS of the serving BS in its secondary subband/subframe identical to the primary subband/subframe of the serving BS, referring to the channel information of the cell-edge MS in step 818.

While not shown, each of the serving and the secondary BS may calculate transmit antenna weight for its cell-inner MSs in step 816 and 818. Subsequently, the serving BS and the secondary BS transmit signals to the cell-edge MS of the serving BS using their calculated transmit antenna weights in the resources of the same subband/subframe in step 820. Therefore, the cell-edge MS receives signals from the plurality of BSs through cooperation among the BSs. Each of the serving and secondary BSs transmits a signal to its cell-inner MSs in the allocated resources using transmit antenna weights.

As described above, each BS transmits a signal to a cell-edge MS in its primary subband/subframe and a signal to a cell-inner MS across an entire frequency band or over an entire time area. In the example of FIGS. 4 and 5, a type-A cell designates Subband 1 as its primary subband and transmits a signal to its cell-edge MS and cell-inner MS in Subband 1 and a signal to its cell-inner MSs in secondary subbands, Subband 2 and Subband 3 in FIG. 4. A type-B cell designates Subband 2 as its primary subband and transmits a signal to its cell-edge MS and cell-inner MS in Subband 2 and a signal to its cell-inner MSs in secondary subbands, Subband 1 and Subband 3. A type-C cell designates Subband 3 as its primary subband and transmits a signal to its cell-edge MS and cell-inner MS in Subband 3 and a signal to its cell-inner MSs in secondary subbands, Subband 1 and Subband 2.

The foregoing BS cooperative operation may be performed by a CoMP management unit of each BS.

Figure 9:
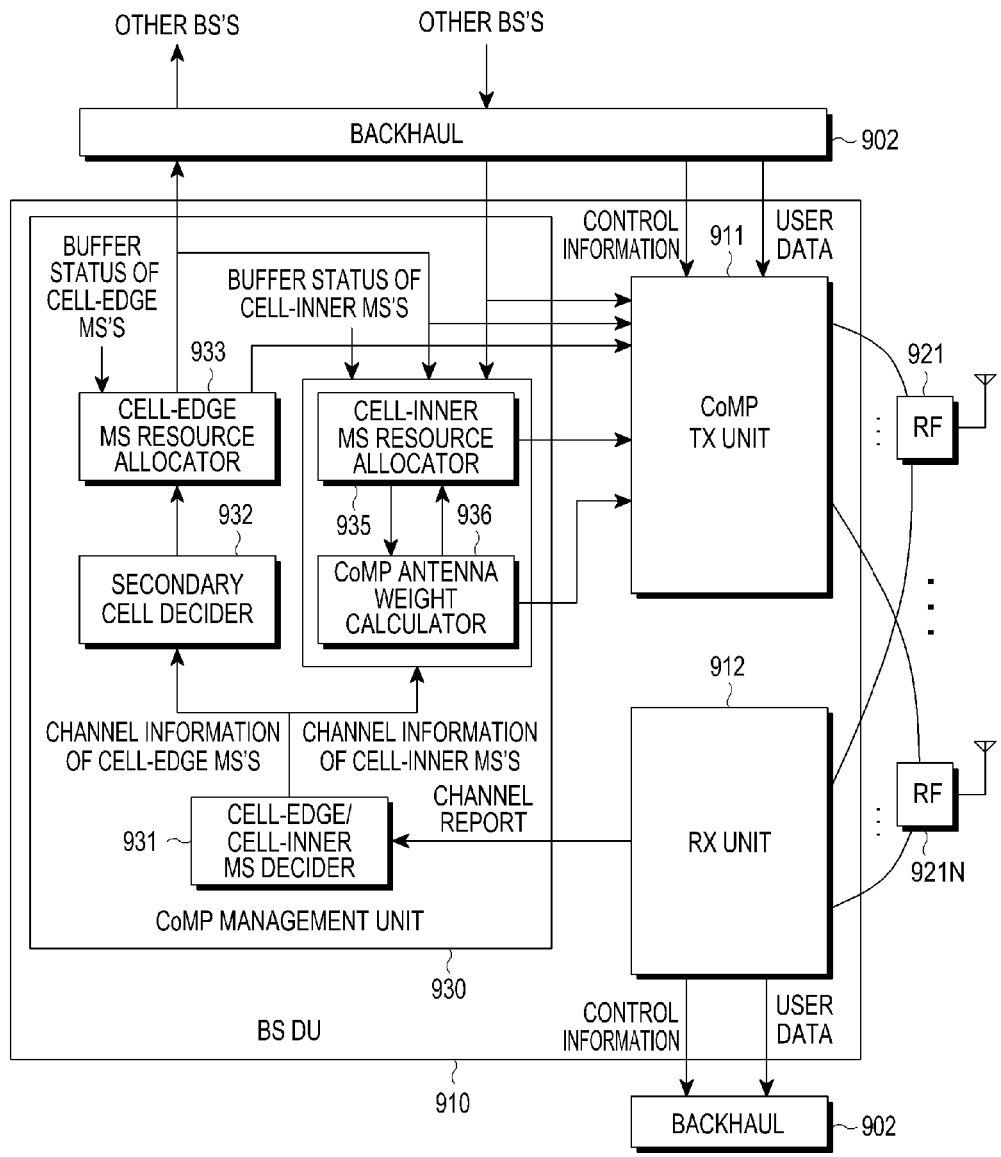
FIG. 9 illustrates a BS for BS cooperative transmission according to an embodiment of the present invention.

FIG. 9 illustrates a BS for performing a BS cooperative transmission according to an embodiment of the present invention. While a CoMP management unit 930 is shown in FIG. 9 as including a plurality of components, it will be apparent to those skilled in the art that one or more of the components can be implemented as a software program stored in a memory and a processor that executes the program.

Referring to FIG. 9, a BS Digital Unit (DU) 910 includes a CoMP Transmission (Tx) unit 911, a Reception (Rx) unit 912, and the CoMP management unit 930. The CoMP Tx unit 911 and the Rx unit 912 are connected to N Radio Frequency (RF) units 921 to 921N each having one Tx antenna, for wireless communication with MSs.

The Rx unit 912 receives a signal from at least one MS located within a cell of the BS and transmits user data and control information to a wireless network via a backhaul 902. The Rx unit 912 also transmits channel information of the MS about the cell and neighbor interfering cells, extracted from the received signal to a cell-edge/cell-inner MS decider 931 of the CoMP management unit 930. When needed, position information about the MS may also be transmitted to the cell-edge/cell-inner MS decider 931, which determines based on the channel information and the position information whether the MS is a cell-edge MS or a cell-inner MS. A secondary cell decider 932 determines, as secondary cells, neighbor cells to cooperate with for signal transmission to a cell-edge MS based on channel information of the cell-edge MS about the neighbor interfering cells, and transmits channel information about a serving cell and the secondary cells reported by the cell-edge MS to a cell-edge MS resource allocator 933.

When determining the presence of data to be transmitted to the cell-edge MS based on buffer status information indicating the amount of data to be transmitted to the cell-edge MS, the cell-edge MS resource allocator 933 allocates primary subband/subframe resources for data transmission to the cell-edge MS, and transmits resource allocation information representing the resource allocation result and the channel information to a cell-inner MS resource allocator 935 and other BSs. The cell-inner MS resource allocator 935 receives the resource allocation information and channel information about the cell-edge MS allocated to the primary subband/subframe from the cell-edge MS resource allocator 933 and receives resource allocation information and channel information about a CoMP MS of a neighbor cell allocated to its secondary subband/subframe from the neighbor cell. The cell-inner MS resource allocator 935 selects at least one cell-inner MS to receive a signal in the primary subband/subframe or the secondary subband/subframe and allocates an MCS and radio resources to the cell-inner MS.

A CoMP antenna weight calculator 936 calculates optimum CoMP transmit antenna weights for the cell-inner MS and the cell-edge MS based on the channel information of the cell-inner MS and the cell-edge MS received from the cell-edge/cell-inner MS decider 931. The cell-inner MS resource allocator 935 may need a transmit antenna weight calculated for each cell-inner MS to select the next cell-inner MS by a cell-inner MS selection algorithm.

A CoMP Tx unit 911 receives control information and user data of another BS via the backhaul 902. The CoMP Tx unit 911 transmits a signal simultaneously to the cell-edge MS and the cell-inner MS in its primary subband/subframe using the resource allocation results of the cell-edge MS resource allocator 933 and the cell-inner MS resource allocator 935 and the transmit antenna weights calculated by the transmit antenna weight calculator 936. In addition, the CoMP Tx unit 911 transmits signals simultaneously to the cell-edge MS of the neighbor cell and its cell-inner MS.

While embodiments of the present invention have been described based on each cell being a geographical unit coverage for a CoMP operation, it may be further contemplated that a plurality of cells are set as a unit coverage for a CoMP operation according to BS implementation and a backhaul state. If three sectors or three cells are deployed at the same position in the same equipment, resource allocation scheduling for the three sectors or cells can be performed in the same manner as for a single cell. Depending on a backhaul performance and an implementation situation, scheduling and antenna weight calculation can be performed in one instance for more cells.

In a BS cooperation method according to an embodiment of the present invention, a plurality of cells are grouped as a coverage (herein a super cell) for a CoMP operation according to a BS and backhaul implementation situation and BSs cooperate with each other on a supercell basis. Each supercell includes a single CoMP management unit and performs transmit antenna weight calculation and MS resource allocation at one time for all cells of the supercell in the same manner as for a single cell. For signal transmission to an MS at the edge of a supercell, a plurality of supercells cooperate with one another, as described above.

Figure 10:
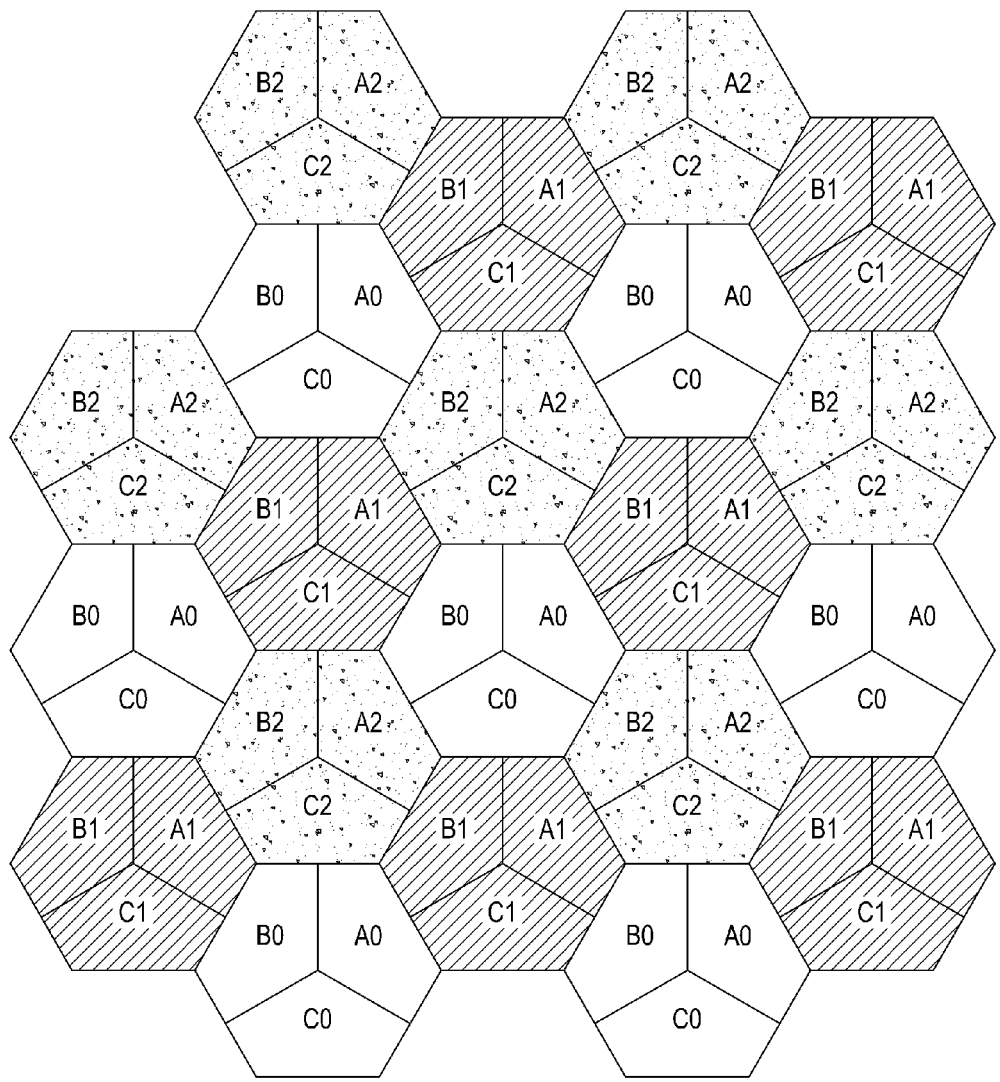
FIG. 10 illustrates a network for cooperation of super-cellular BSs according to an embodiment of the present invention.

FIG. 10 illustrates a network for cooperation of super-cellular BSs according to an embodiment of the present invention.

Referring to FIG. 10, each super cell is composed of three cells A, B and C and classified as one of three supercell types 0, 1 and 2. Each supercell type has a different primary subband/subframe, selects one or more cell-edge MSs in the three cells of the supercell, and allocates resources of the primary subband/subframe to the cell-edge MSs. Supercells exchange resource allocation information and channel information about their cell-edge MSs, select their cell-inner MSs, and transmit signals to the cell-edge MSs and cell-inner MSs. Resource allocation and transmit antenna weight calculation for cell-inner MSs of each supercell are simultaneously performed, considering the three cells A, B and C included in the supercell.

Figure 11:
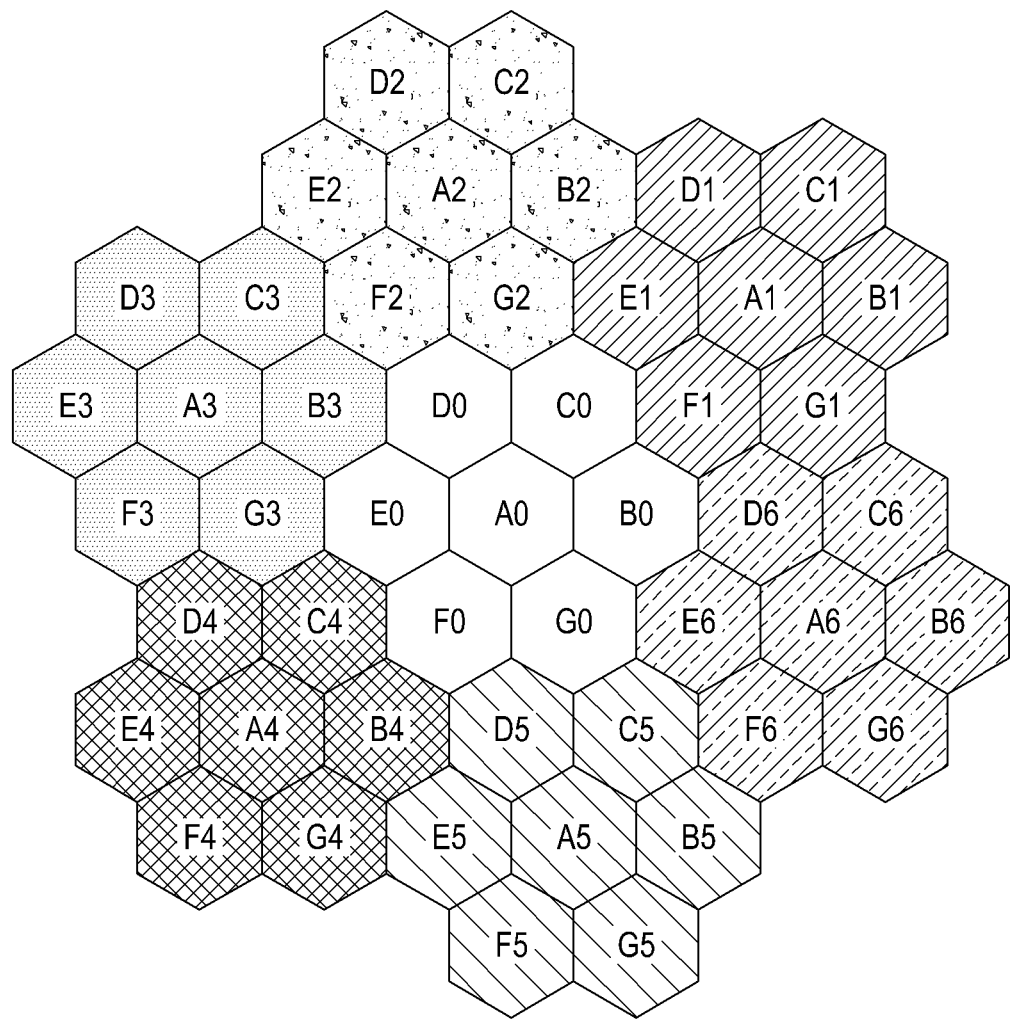
FIG. 11 illustrates another exemplary configuration of a network for cooperation of super-cellular BSs according to an embodiment of the present invention.

FIG. 11 illustrates another configuration of a network for cooperation of super-cellular BSs according to an embodiment of the present invention.

Referring to FIG. 11, each supercell includes Cells A, B, C, D, E, F and G and is classified as one of 7 types, types 0, 1, 2, 3, 4, 5 and 6. A different primary subband/subframe is assigned to each supercell type and each supercell has a CoMP management unit for handling cooperation of 7 cells together. The CoMP management units of supercells cooperate with each other in the same manner as described above.

The foregoing extended BS cooperation scheme increases the communication performance both inside and at the edge of a supercell because all cells of the supercell cooperate for resource allocation and signal transmission to MSs within the supercell and signals are transmitted to MSs at the edges of supercells in primary or secondary subbands/subframes through cooperation among the supercells.

As is apparent from the above description, the present invention improves CoMP performance due to simple CoMP implementation and reduced backhaul overhead and delay. In addition, the present invention enables simple implementation of a CoMP resource allocation process and reduces handover overhead by eliminating handover between CoMP processing units.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A multi-cell cooperative transmission method by a serving base station (BS), the method comprising:
   identifying at least one first mobile station (MS) that is located within a serving cell and that is capable of being served by at least one of neighbor BSs;
   selecting at least one secondary BS that is capable of serving the at least one first MS or selecting at least one secondary cell corresponding to the at least one secondary BS, for BS cooperative transmission to the at least one first MS, the at least one secondary BS being selected from among the neighbor BSs;
   identifying at least one second MS that is located within the serving cell and that has a channel that support single-cell multi-user multiple input multiple output (MIMO) transmission with the at least one first MS;
   allocating, by the serving BS, a radio resource to the at least one first MS;
   transmitting, to the at least one secondary BS, resource allocation information indicating the allocated radio resource for the at least one first MS, and channel information related to a channel state measured by the at least one first MS;

calculating transmit antenna weights for the at least one first MS and the at least one second MS for the single-cell multi-user MIMO transmission based on the channel state and interferences within the serving cell; and transmitting, by the serving BS, signals for the at least one first MS and for the at least one second MS using the calculated transmit antenna weights concurrently with multi-cell cooperative transmission executed by the at least one secondary BS based on the allocated radio resource.

2. The multi-cell cooperative transmission method of claim 1, wherein the at least one first MS is identified based on at least one of channel information about the serving BS and the neighbor BSs reported by the at least one first MS and position information of the at least one first MS.

3. The multi-cell cooperative transmission method of claim 1, wherein the allocating comprises allocating radio resource of a first resource region to the at least one first MS from among an entire system resource, the entire system resource being divided into at least one first resource region assigned as a primary resource for serving MSs within the serving cell by at least one of neighbor BSs and at least one second resource region assigned as a secondary resource for serving remaining MSs within the serving cell, and wherein the at least one second resource region is assigned as a primary resource of the neighbor BSs, for serving MSs within neighbor cells by the serving BS.

4. The multi-cell cooperative transmission method of claim 3, wherein the entire system resource further includes at least one third resource region for use in transmitting a signal to an MS in a single-cell signal transmission.

5. The multi-cell cooperative transmission method of claim 3, wherein the entire system resource is configured in a frequency domain, a time domain, or a time-frequency domain.

6. The multi-cell cooperative transmission method of claim 1, further comprising selecting at least one MS within the serving cell to receive signals using the allocated radio resource based on interference with MSs within neighbor cells, and allocating the radio resource to the at least one selected MS.

7. The multi-cell cooperative transmission method of claim 1, further comprising selecting at least one MS within the serving cell to receive signals using the allocated radio resource based on the number of MSs to which signals are simultaneously transmittable on the allocated radio resource, and allocating the radio resource to the at least one selected MS.

8. The multi-cell cooperative transmission method of claim 1, wherein the at least one first MS is identified based on at least one of a distance between the serving BS and the at least one first MS and a ratio of a signal strength of the serving cell to interference and noise of neighbor cells.

9. The multi-cell cooperative transmission method of claim 1, wherein the at least one secondary BS or the at least one secondary cell is selected based on at least one of a received signal strength of each of neighbor cells at the at least one first MS, a ratio of a received signal strength of the serving cell to the received signal strength of each neighbor cell at the at least one first MS, and the distance between the at least one first MS and each neighbor cell.

10. The multi-cell cooperative transmission method of claim 1, wherein each of the serving cell and secondary cell includes one or more sectors.

11. A multi-cell cooperative transmission method by a serving base station (BS), the method comprising:

receiving, by the serving BS from a neighbor BS, channel information related to a channel state measured by at least one first mobile station (MS) located within a neighbor cell of the neighbor BS and that is capable of being served by the serving BS, and resource allocation information indicating radio resource allocated to the at least one first MS by the neighbor BS;

identifying at least one second MS that is located with a serving cell of the serving BS and that has a channel that supports single-cell multi-user multiple input multiple output (MIMO) transmission with the at least one first MS;

calculating transmit antenna weights for the at least one first MS and the at least one second MS for the single-cell multi-user MIMO transmission based on the channel state and interferences within the serving cell; and transmitting, by the serving BS, signals for the at least one first MS and signals for the at least one second MS by using the calculated transmit antenna weights concurrently with multi-cell cooperative transmission executed by the neighbor BS based on the resource allocation information indicating the allocated radio resource.

12. The multi-cell cooperative transmission method of claim 11, wherein the radio resource belongs to a second resource region among an entire system resource that is divided into at least one first resource region assigned as a primary resource for serving MSs located within the serving cell and that is capable of being served by at least one of neighbor BSs and the at least one second resource region assigned as a secondary resource for serving remaining MSs within the serving cell, and wherein the at least one second resource region is assigned as a primary resource of the neighbor BS, for serving MSs within the neighbor cell.

13. The multi-cell cooperative transmission method of claim 12, wherein the entire system resource further includes at least one third resource region for use in transmitting a signal to an MS in a single-cell signal transmission method.

14. The multi-cell cooperative transmission method of claim 12, wherein the entire system resource is configured in a frequency domain, a time domain, or a time-frequency domain.

15. The multi-cell cooperative transmission method of claim 11, further comprising selecting at least one MS within the serving cell to receive signals using the allocated radio resource based on interference with MSs within the neighbor cell and allocating the radio resource to the at least one selected MS.

16. The multi-cell cooperative transmission method of claim 11, further comprising selecting at least one MS within the serving cell to receive signals using the allocated radio resource based on the number of MSs to which signals are simultaneously transmittable on the allocated radio resource, and allocating the radio resource to the at least one selected MS.

17. The multi-cell cooperative transmission method of claim 11, wherein each of the serving cell and the neighbor cell includes one or more sectors.

18. A base station (BS) that manages a serving cell for performing multi-cell cooperative transmission, the BS comprising:

a processor that identifies at least one first mobile station (MS) that is located within the serving cell and that is capable of being served by at least one of neighbor BSs, that selects, from among the neighbor BSs, at least one secondary BS that is capable of serving the at least one first MS, or that selects at least one secondary cell corresponding to the at least one secondary BS, for BS cooperative transmission to the at least one first MS, that identifies at least one second MS that is located within the serving cell and that has a channel that supports single-cell multi-user multiple input multiple output (MIMO) transmission with the at least one first MS, that allocates a radio resource to the at least one first MS, and that calculates transmit antenna weights for the at least one first MS and the at least one second MS for the single-cell multi-user MIMO transmission based on a channel state measured by the at least one first MS and interferences within the serving cell; and a transmitter that transmits, to the at least one secondary BS, resource allocation information indicating the allocated radio resource for the at least one first MS, and channel information related to the channel state measured by the at least one first MS, and that transmits signals for the at least one first MS and signals for the at lease one second MS using the calculated transmit antenna weights concurrently with multi-cell cooperative transmission executed by the at least one second BS based on the allocated radio resource.

19. The BS of claim 18, wherein the processor further identifies the MS based on at least one of channel information about the serving BS and the neighbor BSs reported by the MS and position information of the MS.

20. The BS of claim 18, wherein the processor further allocates radio resource of a first resource region to the at least one first MS from among an entire system resource that is divided into at least one first resource region assigned as a primary resource for serving MSs within the serving cell by at least one of neighbor BSs and at least one second resource region assigned a secondary resource for serving remaining MSs within the serving cell, and wherein the at least one second resource region is assigned as a primary resource of the neighbor BSs, for serving MSs within neighbor cells by the BS.

21. The BS of claim 20, wherein the entire system resource further includes at least one third resource region for use in transmitting a signal to an MS in a single-cell signal transmission.

22. The BS of claim 20, wherein the entire system resource is configured in a frequency domain, a time domain, or a time-frequency domain.

23. The BS of claim 18, wherein the processor further selects at least one MS within the serving cell to receive signals using the allocated radio resource based on interference with MSs within neighbor cells, and allocates the radio resource to the at least one selected MS.

24. The BS of claim 18, wherein the processor further selects at least one MS within the serving cell to receive signals using the allocated radio resource based on the number of MSs to which signals are simultaneously transmittable on the allocated radio resource, and allocates the radio resource to the at least one selected MS.

25. The BS of claim 18, wherein the processor further identifies the MS based on at least one of the distance between the BS and the MS and a ratio of a signal strength of the serving cell to interference and noise of neighbor cells.

26. The BS of claim 18, wherein the processor further selects the at least one secondary BS or the at least one secondary cell based on at least one of a received signal strength of each of neighbor cells at the MS, a ratio of a received signal strength of the serving cell to the received signal strength of each neighbor cell at the MS, and the distance between the MS and each neighbor cell.

27. The BS of claim 18, wherein each of the serving cell and secondary cell includes one or more sectors.

28. A base station (BS) that manages a serving cell for performing multi-cell cooperative transmission, comprising:
a receiver that receives, from a neighbor BS, channel information related to a channel state measured by at least one first mobile station (MS) located within a neighbor cell of the neighbor BS and that is capable of being served by the BS, and resource allocation information indicating radio resource allocated to the at least one first MS by the neighbor BS;
a controller that identifies at least one second MS that is located within the serving cell and that has a channel that supports single-cell multi-user multiple input multiple output (MIMO) transmission with the at least one first MS, and that calculates transmit antenna weights for the at least one first MS and the at least one second MS for the single-cell multi-user MIMO transmission based on the channel information and interferences within the serving cell of the serving BS; and
a transmitter that transmits signals for the at least one first MS and signals for the at least one second MS by using the calculated transmit antenna weights concurrently with multi-cell cooperative transmission executed by the neighbor BS based on the radio resource indicated by the resource allocation information.

29. The BS of claim 28, wherein the radio resource belongs to a second resource region among an entire system resource that is divided into at least one first resource region assigned as a primary resource for serving MSs within the serving cell serving cell and that is capable of being served by at least one of neighbor BSs and the at least one second resource region assigned as a secondary resource for serving remaining MSs within the serving cell, and wherein the at least one second resource region is assigned as a primary resource of the neighbor BS, for serving MSs within the neighbor cell.

30. The BS of claim 29, wherein the entire system resource further includes at least one third resource region for use in transmitting a signal to an MS in a single-cell signal transmission method.

31. The BS of claim 29, wherein the entire system resources is configured in a frequency domain, a time domain, or a time-frequency domain.

32. The BS of claim 28, further comprising a processor that selects at least one MS within the serving cell to receive signals using the allocated radio resource based on interference with MSs within the neighbor cell, and that allocates the radio resource to the at least one selected MS.

33. The BS of claim 28, further comprising a processor that selects at least one MS within the serving cell to receive signals using the allocated radio resource based on the number of MSs to which signals are simultaneously transmittable in the allocated radio resource, and that allocates the radio resource to the at least one selected MS.

34. The BS of claim 28, wherein each of the serving cell and the secondary cell includes one or more sectors.

* * * * *